(12) United States Patent
Bosworth

(10) Patent No.: US 10,939,033 B2
(45) Date of Patent: Mar. 2, 2021

(54) SYSTEMS AND METHODS FOR DIRECTING ADAPTIVE CAMERA SYSTEMS

(71) Applicant: FACEBOOK TECHNOLOGIES, LLC, Menlo Park, CA (US)

(72) Inventor: Andrew Garrod Bosworth, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 253 days.

(21) Appl. No.: 15/924,825

(22) Filed: Mar. 19, 2018

(65) Prior Publication Data
US 2019/0289198 A1  Sep. 19, 2019

(51) Int. Cl.
| H04N 5/00 | (2011.01) |
| H04N 5/232 | (2006.01) |
| G06T 19/00 | (2011.01) |
| G06F 3/01 | (2006.01) |

(52) U.S. Cl.
CPC ......... *H04N 5/23219* (2013.01); *G06F 3/017* (2013.01); *G06T 19/006* (2013.01); *H04N 5/23203* (2013.01)

(58) Field of Classification Search
CPC . H04N 5/00; H04N 7/00; G06T 19/00; G06T 7/00
See application file for complete search history.

(56) References Cited

U.S. PATENT DOCUMENTS

| 2009/0096858 A1* | 4/2009 | Jeong | G01S 3/7864 348/14.02 |
| 2015/0244807 A1* | 8/2015 | Shoemake | H04L 67/125 709/202 |
| 2018/0239426 A1* | 8/2018 | Yoshifuji | G06F 3/0488 |

* cited by examiner

*Primary Examiner* — Maryam A Nasri
(74) *Attorney, Agent, or Firm* — FisherBroyles, LLP

(57) ABSTRACT

The disclosed computer-implemented method for directing adaptive camera systems may include (i) monitoring, via a camera that is part of a camera system, a person within a physical environment, (ii) detecting, by the camera system, a gesture performed by the person, (iii) determining, by the camera system, that the gesture indicates an element of the physical environment, and (iv) performing, by the camera system, an action directed at the element of the physical environment in response to determining, by the camera system, that the gesture indicates the element of the physical environment. Various other methods, systems, and computer-readable media are also disclosed.

20 Claims, 12 Drawing Sheets

SYSTEMS AND METHODS FOR DIRECTING ADAPTIVE CAMERA SYSTEMS

BACKGROUND

Many devices include cameras, from desktop computing systems to mobile devices, such as tablets and smartphones, to wearable systems such as smart watches and gaming headsets. Users may use the cameras on their devices for a wide variety of activities, such as conference calls for business purposes, video calls to friends and family, recording images or video to post to social media sites, creating video tutorials of various processes, capturing video as part of an augmented reality system, or any of a host of other activities. Regardless of the activity, having the subject of the recording within the camera frame and in focus is essential.

Traditionally, a camera has a fixed camera frame that can be changed either by physically moving the camera or by changing settings on the camera to pan, zoom, or otherwise make changes to the camera frame. Manually changing a camera's settings may be far from ideal if a user is engaged in some activity that occupies the user's hands or attention. The instant disclosure, therefore, identifies and addresses a need for systems and methods for directing adaptive camera systems.

SUMMARY

As will be described in greater detail below, the instant disclosure describes systems and methods for directing adaptive camera systems via intuitive gestures already understood by users.

In one example, a computer-implemented method for directing adaptive camera systems may include (i) monitoring, via a camera that is part of a camera system, a person within a physical environment, (ii) detecting, by the camera system, a gesture performed by the person, (iii) determining, by the camera system, that the gesture indicates an element of the physical environment, and (iv) performing, by the camera system, an action directed at the element of the physical environment in response to determining, by the camera system, that the gesture indicates the element of the physical environment.

In one embodiment, the gesture may include a human-readable gesture. In one example, the gesture may indicate the element of the physical environment to an additional person.

In one embodiment, performing, by the camera system, the action may include determining that the gesture is correlated with a predetermined action from a list of actions correlated with gestures. In some examples, performing the action may include physically moving the camera by the camera system.

Additionally or alternatively, performing the action may include adjusting a camera frame of the camera. In some examples, performing the action may include moving the camera frame of the camera to include within the camera frame the element of the physical environment indicated by the gesture. In some examples, performing the action may include adjusting the camera frame of the camera to increase the prominence within the camera frame of the element of the physical environment indicated by the gesture. In some examples, performing the action may include changing the focus of the camera to the element of the physical environment indicated by the gesture.

In some examples, performing the action may include retrieving, by the camera system, information about the element of the physical environment indicated by the gesture. In some examples, performing the action may include displaying information about the element of the physical environment indicated by the gesture. Additionally or alternatively, performing the action may include storing, by the camera system, information about the element of the physical environment indicated by the gesture.

In one embodiment, the gesture may include a pointing gesture at the element of the physical environment and the element of the physical environment may include an object. Additionally or alternatively, the gesture may indicate a portion of the physical environment and determining, by the camera system, that the gesture indicates the element of the physical environment may include examining, by the camera system, the portion of the physical environment indicated by the gesture.

In some examples, the gesture may include a hand gesture and monitoring, via the camera that is part of a camera system, the person within the physical environment may include motion tracking a hand of the person. Additionally or alternatively, detecting, by the camera system, the gesture performed by the person may include detecting an audio trigger in an audio feed of the camera system and detecting the gesture in response to detecting the audio trigger.

In one example, the camera system may include an augmented reality system and performing the action may include the augmented reality system augmenting the physical environment with an augmented reality element that corresponds to the element of the physical environment. In another example, the camera system may include a video-conferencing system, monitoring the person within the physical environment may include monitoring a participant in a videoconference that includes at least one additional participant who does not share the physical environment with the participant, and performing the action may include increasing a visibility of the element of the physical environment within a video feed that is displayed by the camera system to the additional participant in the videoconference.

In one embodiment, a system for implementing the above-described method may include several modules stored in memory, including (i) a monitoring module that monitors, via a camera that is part of a camera system, a person within a physical environment, (ii) a detection module that detects, by the camera system, a gesture performed by the person, (iii) a determination module that determines, by the camera system, that the gesture indicates an element of the physical environment, (iv) an action module that performs, by the camera system, an action directed at the element of the physical environment in response to determining, by the camera system, that the gesture indicates the element of the physical environment, and (v) at least one physical processor that executes the monitoring module, the detection module, the determination module, and the action module.

In some examples, the above-described method may be encoded as computer-readable instructions on a computer-readable medium. For example, a computer-readable medium may include one or more computer-executable instructions that, when executed by at least one processor of a computing device, may cause the computing device to (i) monitor, via a camera that is part of a camera system, a person within a physical environment, (ii) detect, by the camera system, a gesture performed by the person, (iii) determine, by the camera system, that the gesture indicates an element of the physical environment, and (iv) perform, by the camera system, an action directed at the element of the physical environment in response to determining, by the camera system, that the gesture indicates the element of the physical environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
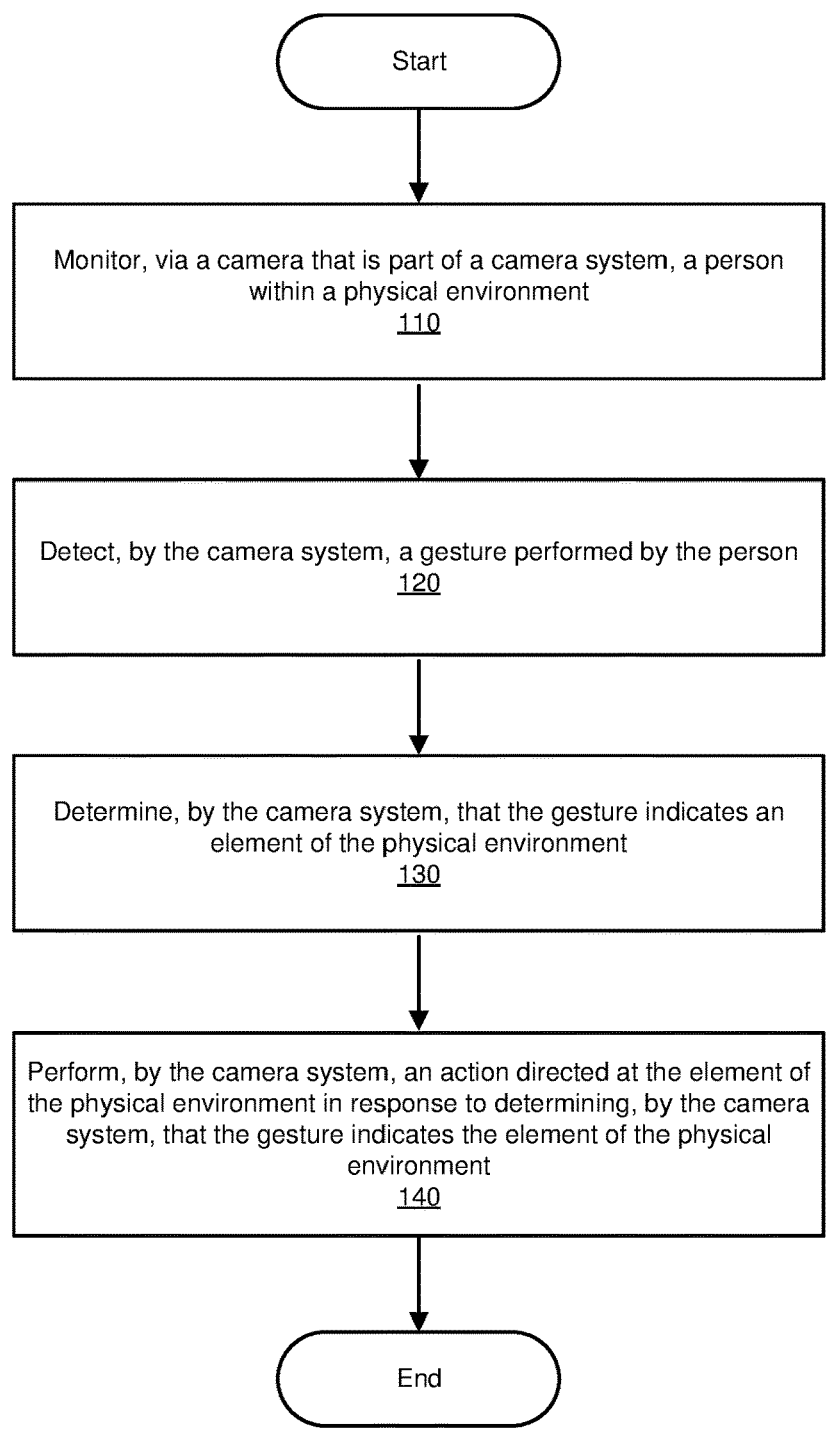
FIG. 1 is a flow diagram of an exemplary method for directing adaptive camera systems.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for directing adaptive camera systems. As will be explained in greater detail below, by directing an adaptive camera system in response to gestures made by the user, the systems and methods described herein may enable users to direct the camera system without manually changing the camera's settings or being foiled by counterproductive automatic focusing mechanics. By using intuitive, human-readable gestures, the systems and methods described herein may enable a user to direct an adaptive camera system without requiring the user to spend time learning a set of artificial gestures designed specifically to direct camera systems. In addition, the systems and methods described herein may improve the functioning of a computing device by improving the responsiveness of the computing device to user intentions. These systems and methods may also improve the fields of videoconferencing and/or augmented reality by allowing users to direct adaptive camera systems more effectively during a videoconference and/or augmented reality experience.

The following will provide, with reference to FIG. 1, detailed descriptions of an exemplary method for directing adaptive camera systems. Detailed descriptions of illustrations of exemplary systems for directing adaptive cameras will be provided in connection with FIGS. 2-11. In addition, detailed descriptions of an exemplary system for directing adaptive camera systems will be provided in connection with FIG. 12.

FIG. 1 is a flow diagram of an exemplary computer-implemented method 100 for directing adaptive camera systems. The steps shown in FIG. 1 may be performed by any suitable computer-executable code and/or computing system, including the system(s) illustrated in FIG. 12. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may monitor, via a camera that is part of a camera system, a person within a physical environment.

In some examples, the term "camera," as used herein, may refer to a hardware component of a camera system that captures visual information. In some embodiments, a camera may capture still images. Additionally or alternatively, a camera may capture video. In some examples, a camera may have a field of view that encompasses everything visible to the camera. In one example, a camera (or a subsystem that processes input from the camera) may define a camera frame that encompasses everything currently being captured by the physical camera. In another example, the camera system may define a camera frame that encompasses a subset of the area captured by the camera hardware that is processed and/or saved by a camera application. Additionally or alternatively, a camera system may define a frame as the subset of the area captured by the camera that is displayed on a viewing screen. In some embodiments, a camera and/or camera system may have multiple camera frames.

In some examples, the term "camera system," as used herein, may refer to a combination of hardware and/or software components that includes and/or directs a camera. In some embodiments, a camera system may control camera settings such as field of view, camera frame, and/or focus. In one embodiment, a camera system may include one or more visual displays that display information from the camera to one or more users. For example, a camera system may display information on the screen of a stationary computing device, the screen of a mobile computing device, a projector screen, and/or an augmented reality headset. In some embodiments, a camera system may include and/or communicate with one or more applications, including but not limited to a videoconferencing application, a video recording application, a social media application, and/or an augmented reality application.

In some examples, the term "physical environment," as used herein, may refer to a physical location that includes the camera system and at least one person. Examples of a physical environment may include, without limitation, a meeting room, a classroom, a home, and/or an outdoor area. In some examples, a physical environment may include multiple people, not all of whom may be users of the camera system. In some examples, a user of a camera system may be a person who has a user account associated with the camera system and/or who owns, manages, and/or controls the camera system. For example, a physical environment may include a presenter who is giving a lecture and who is the user of the camera system and one or more attendees who are not users of the camera system. In another example, a physical environment may include multiple presenters, only one of whom is registered as a user of the camera system.

The systems described herein may perform step 110 in a variety of ways. In one example, the systems described herein may monitor a predetermined user of the camera system. For example, an augmented reality headset may monitor only the wearer of the augmented reality headset. In other examples, the systems described herein may monitor any person within view of the camera system. For example, a camera system in a conference room may monitor any person standing in front of a whiteboard and/or any person within the conference room, regardless of whether the person is registered as a user of the camera system.

In some embodiments, the systems described herein may monitor the video feed of the camera system. For example, the systems described herein may monitor the video feed to detect whether actions performed by people within view of the camera system match gestures in a set of predetermined gestures that are meaningful to the camera system. In one embodiment, the systems described herein may track the motion of the hands of at least one person in view of the camera system in order to detect hand gestures made by the person.

Additionally or alternatively, the systems described herein may monitor an audio feed of the camera system. In some examples, the systems described herein may monitor the audio feed for a cue that alerts the systems described herein to examine the video feed for a gesture. For example, the systems described herein may monitor the audio feed for the sound of finger snapping, which may then cue the systems described herein to examine the video feed to determine whether a person has snapped their fingers and if so, where the snapping gesture took place. In some embodiments, the systems described herein may identify, based on the audio cue of the snapping sound, the general location of the snapping gesture. These systems may then search a portion of the video feed corresponding to the general location of the snapping gesture and/or may move the camera in the direction of the snapping sound, which may not originate from a snapping gesture performed in an area currently covered by the video feed. In some examples, an audio cue may alert the systems described herein to the type of gesture. For example, the sound of finger snapping may alert the systems described herein to examine the video feed for a snapping gesture, while the sound of hands clapping may alert the systems described herein to examine the video feed for a hand clapping gesture. In some embodiments, an audio cue may change how the systems described herein interpret a gesture. For example, the systems described herein may interpret a pointing gesture accompanied by a verbal exclamation such as "over here!" as being more important, more urgent, and/or indicating a different action than a pointing gesture not accompanied by an exclamation.

At step 120, one or more of the systems described herein may detect, as part of and/or in coordination with the camera system, a gesture performed by the person.

In some examples, the term "gesture," as used herein, may refer to any automatic, instinctive, and/or intentional motion made by a person. In one example, a gesture may be a hand gesture performed with one or both hands, including but not limited to pointing, snapping, waving, beckoning, shooing, and/or framing. In some examples, a gesture may be a static gesture, such as pointing at an object. In other examples, a gesture may include further motion, such as making a circle around an area with a pointing finger. In some examples, a gesture may include a letter, word, or phrase in a signed language, such as American Sign Language. In some embodiments, a gesture may include an auditory component, such as the noise of snapping or clapping. In one embodiment, a gesture may be an arm gesture, such as waving or making a circle with a forearm or an entire arm. In some embodiments, a gesture may be a human-readable gesture. That is, a gesture may be a gesture that is meaningful and/or intelligible to other humans, such as pointing at an object, rather than a gesture that is learned by the person specifically to communicate with a user interface but is not normally used by a person to communicate with other humans, such as manipulating a virtual mouse and/or keyboard. In some examples, the gesture may indicate an element of the physical environment to an additional person. For example, a person pointing at a dog may be performing a gesture that indicates the dog as an element of interest both to the camera system and to any watching person.

The systems described herein may perform step 120 in a variety of ways. In one example, the systems described herein may detect the gesture using a motion-tracking technique that compares the motion of a person and/or a part of a person's body with a set of recognized gestures. In some embodiments, the systems described herein may detect the gesture by detecting an audio trigger in an audio feed of the camera system and may then detect the gesture in response to detecting the audio trigger. For example, the systems described herein may detect the sound of fingers snapping and may then visually detect that a person is snapping the fingers of their left hand. In another example, the systems described herein may detect the sound of a person whistling and may then detect that a person—in some examples, the same as the whistling person, but in other examples, a different person—is pointing their finger at an object.

At step 130, one or more of the systems described herein may determine, as part of and/or in coordination with the camera system, that the gesture indicates an element of the physical environment.

In some examples, the term "element of the physical environment," or "element," as used herein, may refer to any object, area, person, animal, and/or other feature of a physical environment. In one example, an element of the physical environment may be a discrete physical object, such as a set of car keys. In other examples, an element of the physical environment may be a part of another object and/or an area of interest, such as a section of a whiteboard that contains text and/or drawings. In some examples, an element may be a person, such as the person performing the gesture, or an additional person being indicated by the gesture.

The systems described herein may perform step 130 in a variety of ways. In some examples, the systems described herein may determine that the gesture is a human-readable gesture that indicates an element and/or is correlated with one or more predetermined actions by comparing the gesture against a list of gestures. In some examples, the list may be manually specified by a developer and/or user of the camera system, for example by assembling a list of gestures and/or by tagging relevant gestures in a catalogue of possible gestures. In some embodiments, the systems described herein may assemble the list of gestures based at least in part on user feedback (e.g., after a videoconference) about occasions when an element was out of the camera frame, out of focus, and/or otherwise insufficiently captured in an image and/or video. In some examples, the feedback may specify that a gesture indicated the element, while in other cases, the feedback may not include information about a gesture.

In some embodiments, the systems described herein may apply machine learning techniques to determine which gestures indicate elements of the environment to other people. Additionally or alternatively, the systems described herein may apply machine learning techniques to determine in which directions, with what degree of responsiveness, and/or in what way a gesture indicates an element. In one embodiment, the systems described herein may determine that a gesture appears to be directed toward bringing an element to the attention of another person (e.g., in the environment or on the other side of a video call) based on speech, eye contact, the person making the gesture being oriented toward the other person, and/or other cues.

In one example, the systems described herein may determine, based on the type of gesture, the type of element that the gesture indicates. For example, a pointing gesture may indicate a discrete object, while a circling gesture may indicate an area and/or a portion of an object. In another example, a beckoning gesture may indicate that the element is the person performing the gesture. In some embodiments, the systems described herein may determine characteristics of the element based on the intensity of the gesture. For example, the systems described herein may determine that a broad sweeping gesture indicates a larger area than a more restrained sweeping gesture that involves fewer degrees of arm rotation. In another example, the systems described herein may determine that a fully extended arm with a pointing gesture and/or an elevated arm with a pointing gesture indicates an element that is farther away than a pointing gesture made without a fully extended arm.

In some embodiments, the systems described herein may examine the area immediately surrounding and/or indicated by the gesture to determine the element of the environment indicated by the gesture. For example, if the gesture is a pointing gesture, the systems described herein may examine the physical environment in the direction of the pointing gesture. In another example, if the gesture is a framing gesture, the systems described herein may examine the area within the frame created by the gesture.

In some examples, the gesture may indicate a portion of the physical environment and the camera system may determine that the gesture indicates the element of the physical environment by examining the portion of the physical environment indicated by the gesture. In one example, if the gesture is a waving gesture, the systems described herein may examine the area in the direction of the waving gesture to identify the element indicated by the gesture. In some examples, the systems described herein may determine that the area immediately surrounding the gesture is the element indicated by the gesture. For example, a snapping gesture may indicate the area around the snapping gesture.

At step 140, one or more of the systems described herein may perform, as part of and/or in coordination with the camera system, an action directed at the element of the physical environment in response to determining that the gesture indicates the element of the physical environment.

The systems described herein may perform a variety of actions. Examples of actions may include, without limitation, panning the camera, tilting the camera, zooming the camera, re-focusing the camera, adjusting the resolution and/or quality of a live video stream and/or recording, adjusting gain control, adjusting color balance, taking a picture, recording a video, saving information about the element of the physical environment, retrieving information about the element of the physical environment, displaying information about the element of the physical environment, and/or annotating a display of the element of the physical environment.

In some embodiments, the systems described herein may determine that the gesture is correlated with an action from a predetermined list of actions. For example, the systems described herein may determine that a beckoning gesture is correlated with zooming in the camera, while a shooing gesture is correlated with zooming out the camera. In another example, the systems described herein may determine that a framing gesture is correlated with taking a picture of the area within the frame made by the person's hands, while a pointing gesture is correlated with focusing the camera on the object to which the gesture points. In some examples, the subject of the action may determine which gesture is correlated with the action. For example, the systems described herein may determine that a pointing action at an object is correlated with zooming in on the object, while a pointing gesture at a person is correlated with selecting the person pointed at as the new subject of interest (e.g., indicating to the camera system to attend to that person's gestures rather than the original person's gestures and/or to attend to that person's gestures in addition to attending to the original person's gestures).

Figure 2:
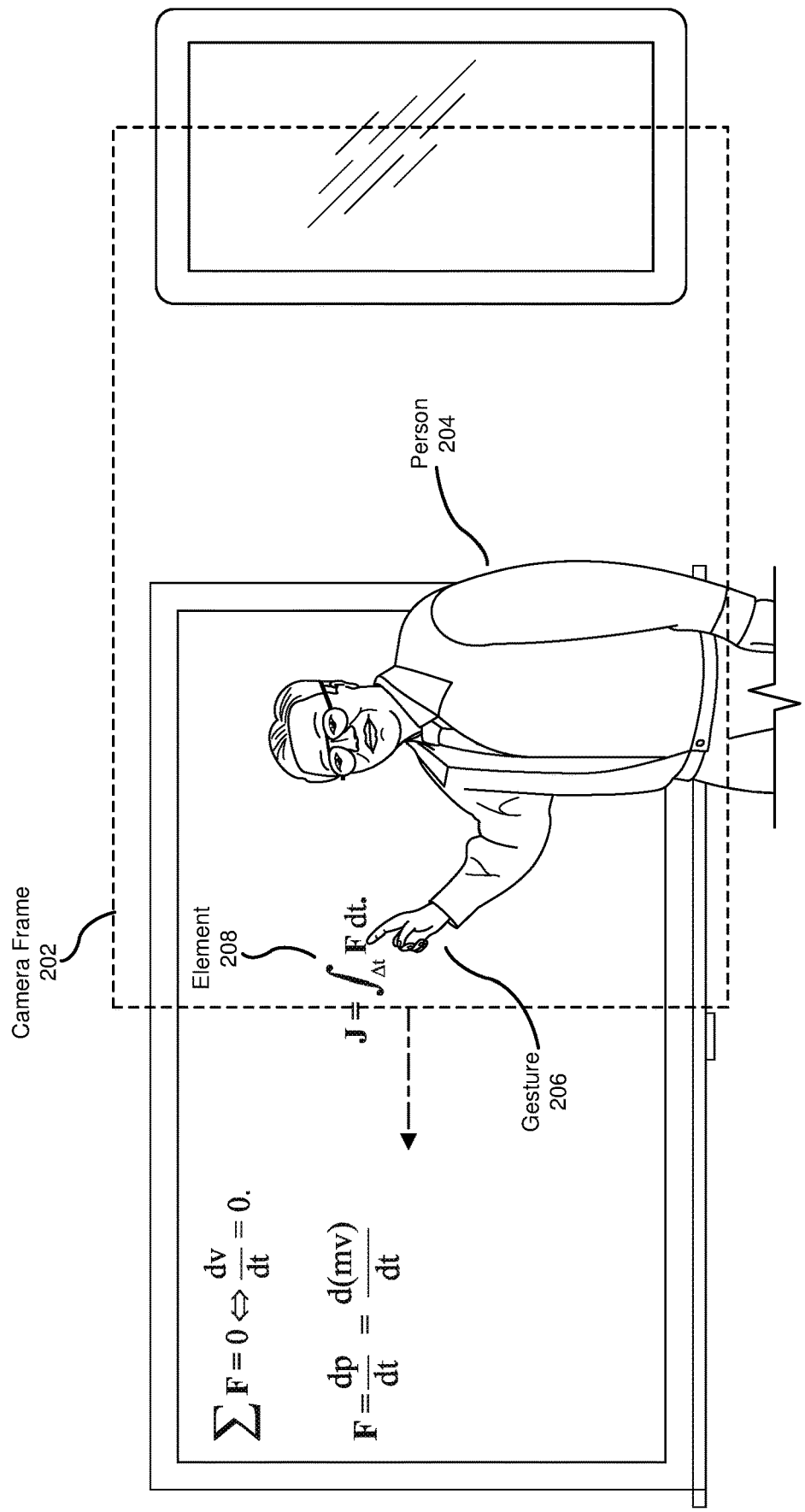
FIG. 2 is an illustration of an exemplary system for directing adaptive camera systems to change camera frames.
Figure 3:
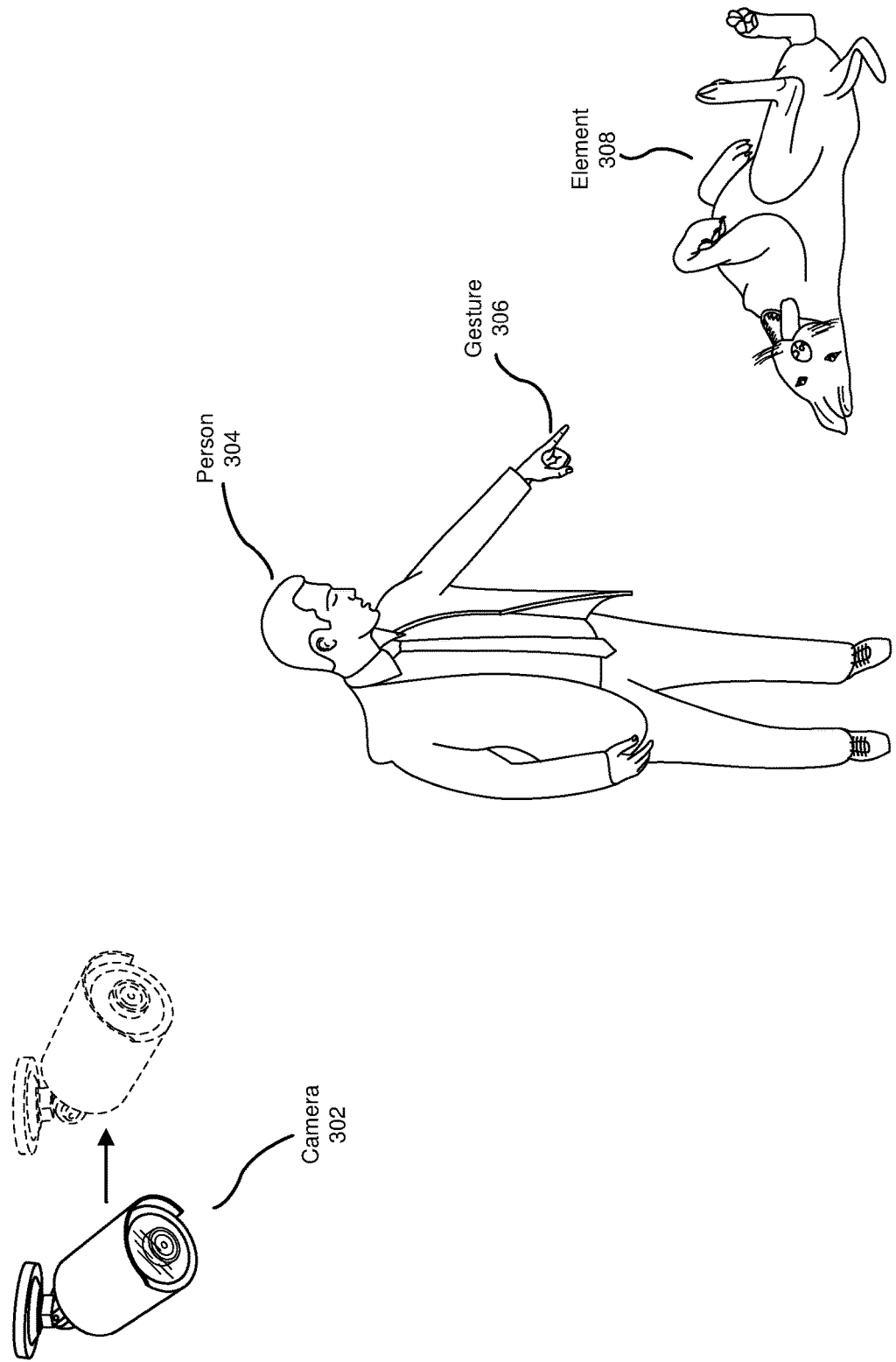
FIG. 3 is an illustration of an exemplary system for directing adaptive camera systems to physically move cameras.

In one example, the systems described herein may center the camera frame of the camera around the element indicated by the gesture and/or move the camera frame of the camera to include within the camera frame the element of the physical environment indicated by the gesture. In some embodiments, a camera system may have a field of vision much wider than the camera frame that actively displays and/or records visual information and may adjust the camera frame within the field of view in response to a gesture. For example, as illustrated in FIG. 2, a camera frame 202 may encompass only a portion of the field of view of a camera system, which may cover the entire whiteboard as well as the window. In this example, a person 204 may perform a pointing gesture 206 to indicate an element 208, an equation on the whiteboard. In some embodiments, the systems described herein may center camera frame 202 on element 208 in response to gesture 206. By adjusting camera frame 202 to center on element 208 in response to gesture 206, the systems described herein may enable the lecturer to continue the lecture with the key material in focus of the camera without pausing the lecture to adjust the camera. By using a human-readable gesture such as pointing to cue the camera system, the systems described herein may enable the lecturer to direct the camera without performing any action that distracts from the lecture. Additionally or alternatively, the camera system may add an additional frame centered on element 208 in response to gesture 206. In some examples, the camera system may display the additional frame in a viewscreen side-by-side with camera frame 202. In one example, the camera system may display the additional frame in an inset within the display of camera frame 202. In some examples, the camera system may enable a user to toggle between views of camera frame 202 and the additional camera frame. In some embodiments, the camera system may record the contents of both camera frames.

In some embodiments, the camera system may physically move the camera. For example, in FIG. 3, a person 304 may make a pointing gesture 306 to indicate an element 308, a dog performing a trick. In this example, camera 302 may not initially be centered on element 308 but may physically move to center the camera frame on element 308. In some embodiments, the systems described herein may perform multiple actions in response to determining that a gesture indicates an element. For example, the systems described herein may both focus camera 302 on element 308 and save a picture of element 308 in response to person 304 indicating element 308 with gesture 306. In some embodiments, the systems described herein may create custom chains of actions associated with gestures. For example, in response to gesture 306, the systems described herein may focus camera 302 on element 308, save a picture of element 308, and then post the picture to a social media account associated with person 304.

Figure 4:
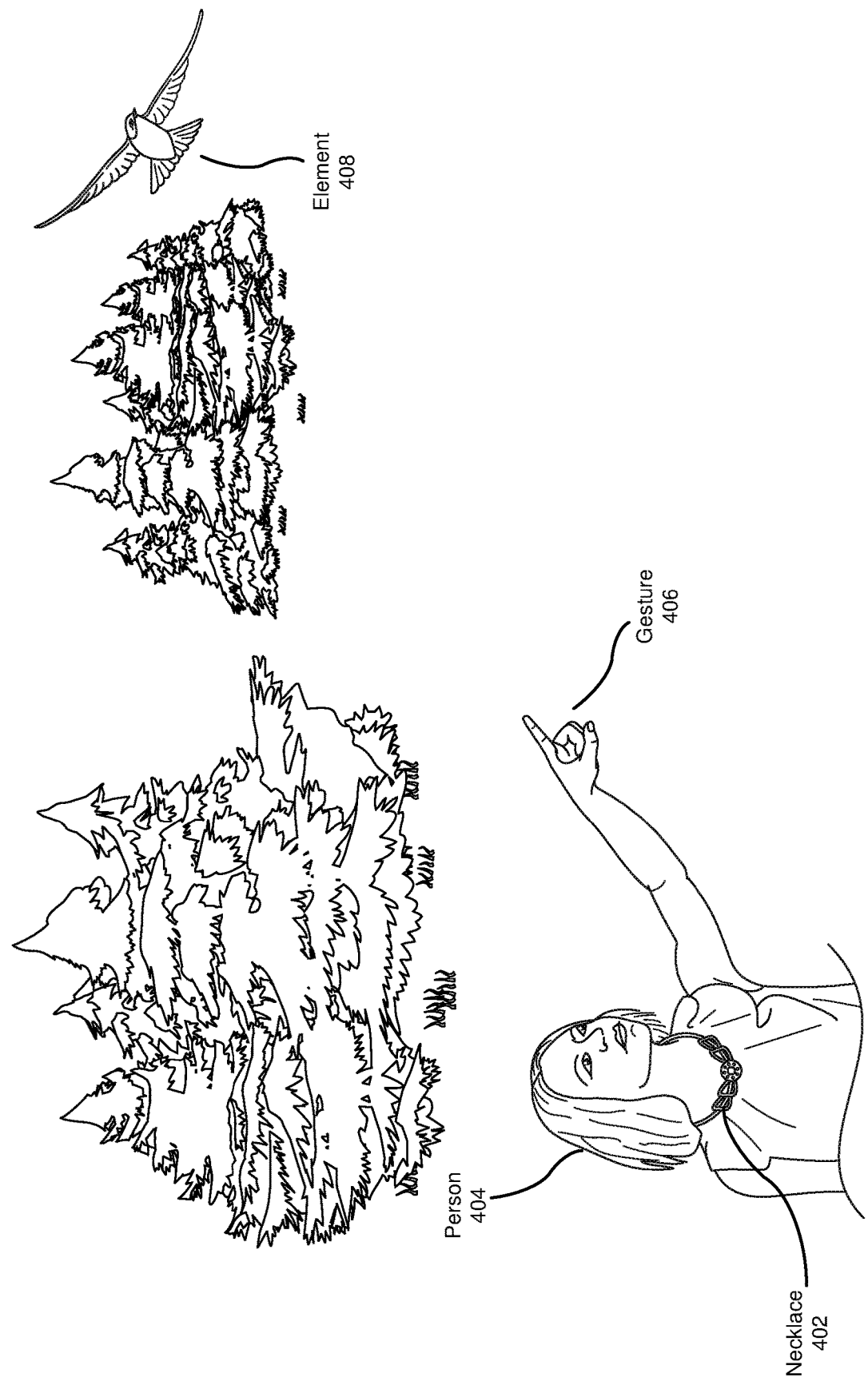
FIG. 4 is an illustration of an exemplary system for directing adaptive camera systems to retrieve information about elements of a physical environment.

In some examples, the systems described herein may retrieve, by the camera system, information about the element of the physical environment indicated by the gesture. For example, as illustrated in FIG. 4, a person 404 may wear a necklace 402 that includes a camera system. In some embodiments, necklace 402 may be part of an augmented reality system. Additionally or alternatively, necklace 402 may be a piece of smart jewelry that includes various hardware and/or software components such as an audio recorder, network connectivity, and/or an artificial intelligence routine. In one example, person 404 may make gesture 406 at an element 408. In some examples, a camera system operating within and/or in communication with necklace 402 may determine that gesture 406 is correlated with retrieving information about element 408. In one example, the camera system may take a picture of element 408, compare the picture of other pictures of birds, determine the species of bird and/or other characteristics of the bird such as territory and/or habits, and then store the information about the bird, relay the information about the bird to person 404 (e.g., audibly, by displaying the information on a screen of an additional device used by person 404, and/or via some other channel), and/or perform some other action with the retrieved information about the bird.

Figure 5:
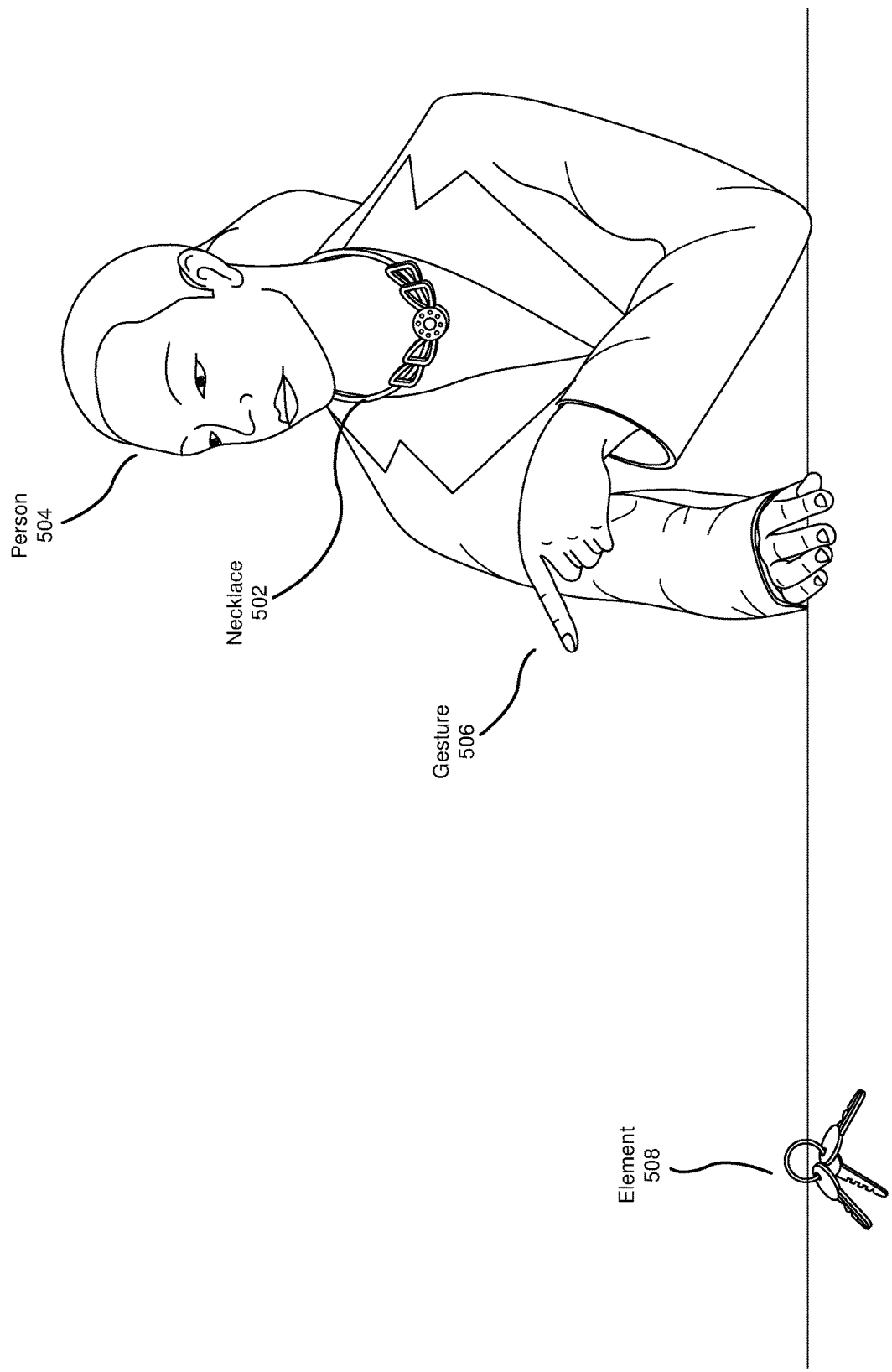
FIG. 5 is an illustration of an exemplary system for directing adaptive camera systems to record information about elements of a physical environment.

In some examples, the systems described herein may perform the action by storing, by the camera system, information about the element of the physical environment indicated by the gesture. For example, as illustrated in FIG. 5, a person 504 wearing a necklace 502 equipped with a camera system may make a gesture 506 indicating an element 508. In one example, the camera system may store information about element 508 such as a picture of the element, tags and/or keywords describing the element, the location of the element, and/or the time when the element was indicated. In one example, person 504 may later query the camera system for a list of all elements indicated during a specified timespan, such as during the last hour or during the day, and the camera system may provide person 504 with information about all such elements. In another example, person 504 may later query the camera system with a directed query, such as, "where did I leave my keys?" and the camera system may retrieve the stored information about element 508 in order to convey to person 504 that the keys are on the desk in the office.

Figure 6:
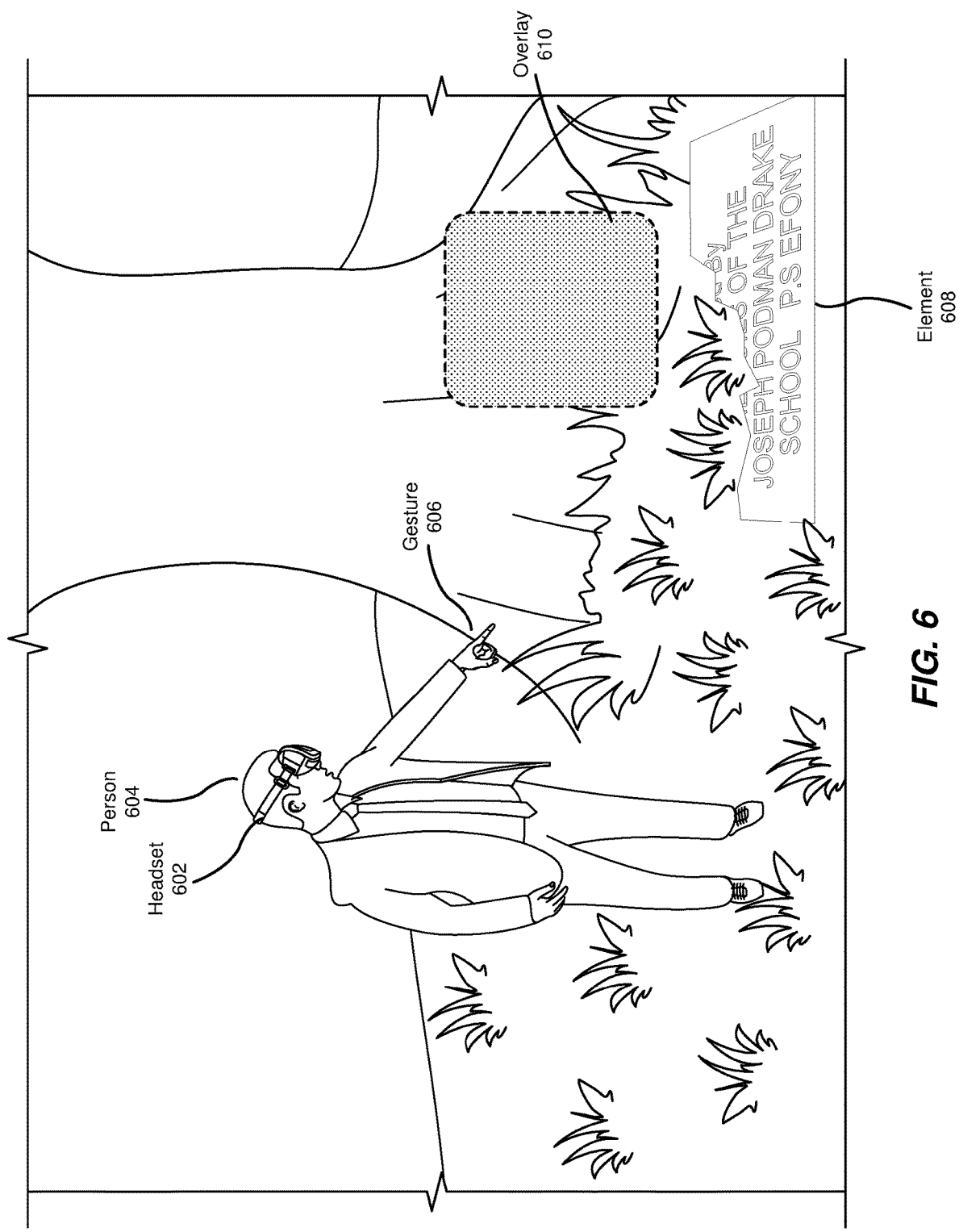
FIG. 6 is an illustration of an exemplary system for directing adaptive camera systems to trigger interactions with augmented reality elements.

In one embodiment, the camera system may include and/or be part of an augmented reality system and performing the action may include the augmented reality system augmenting the physical environment with an augmented reality element that corresponds to the element of the physical environment. For example, as illustrated in FIG. 6, a person 604 may wear an augmented reality headset 602 that may include an external camera and an internal visual display. In one example, person 604 may make a gesture 606 at an element 608 that corresponds to an augmented reality element within the augmented reality system. In some examples, headset 602 may display an overlay 610 on the internal visual display that includes information about element 608. For example, if the augmented reality system is a guided tour of historically significant markers, overlay 610 may include historical information about the marker. In another example, if the augmented reality system is a game where participants capture objectives for points, overlay 610 may include information about how to capture element 608, the point value of element 608, and/or the current in-game owner of element 608. In one embodiment, overlay 610 may be as simple as a translucent red block, indicating that the red team currently controls element 608.

Figure 7:
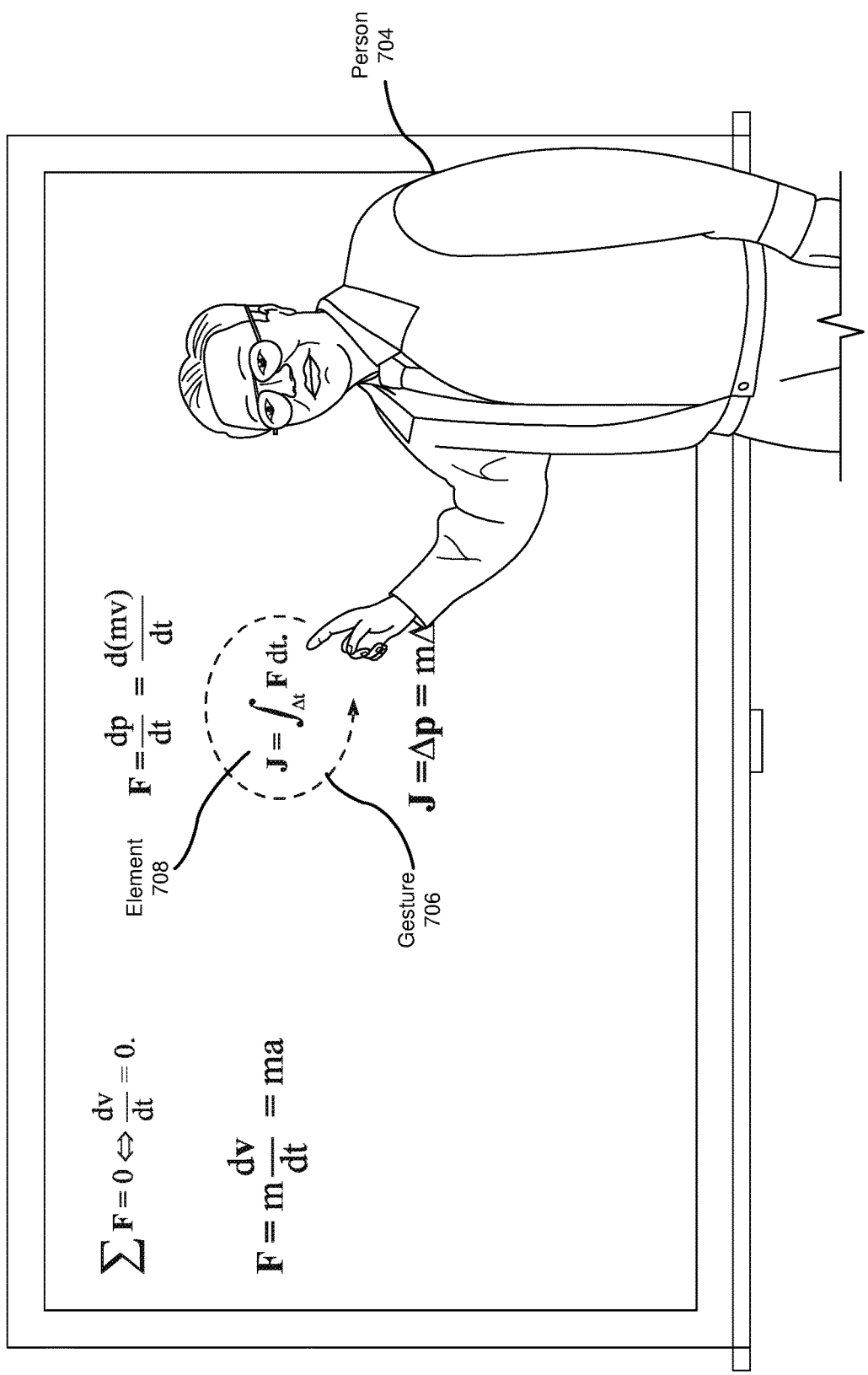
FIG. 7 is an illustration of an exemplary system for directing adaptive camera systems to perform actions related to an element of a physical environment.

In some examples, the systems described herein may adjust the camera frame of the camera to increase a prominence within the camera frame of the element of the physical environment indicated by the gesture. For example, as illustrated in FIG. 7, a person 704 may perform a gesture 706 by drawing a circle around an element 708. In this example, element 708 may be the entire area circled by gesture 706 and/or specifically the equation circled by gesture 706. In one embodiment, the camera system may center the camera frame on element 708. In another embodiment, the camera system may zoom the camera in on element 708. Additionally or alternatively, the camera system may bring element 708 into focus of the camera (e.g., by changing the camera's focus from person 704 to element 708). In some embodiments, the camera system may perform multiple actions in response to a specific gesture. For example, the camera system may zoom in the camera on element 708 and also display additional information about element 708, for example by annotating a streaming video of the lecture with a link to a wiki page explaining the equation.

Figure 8:
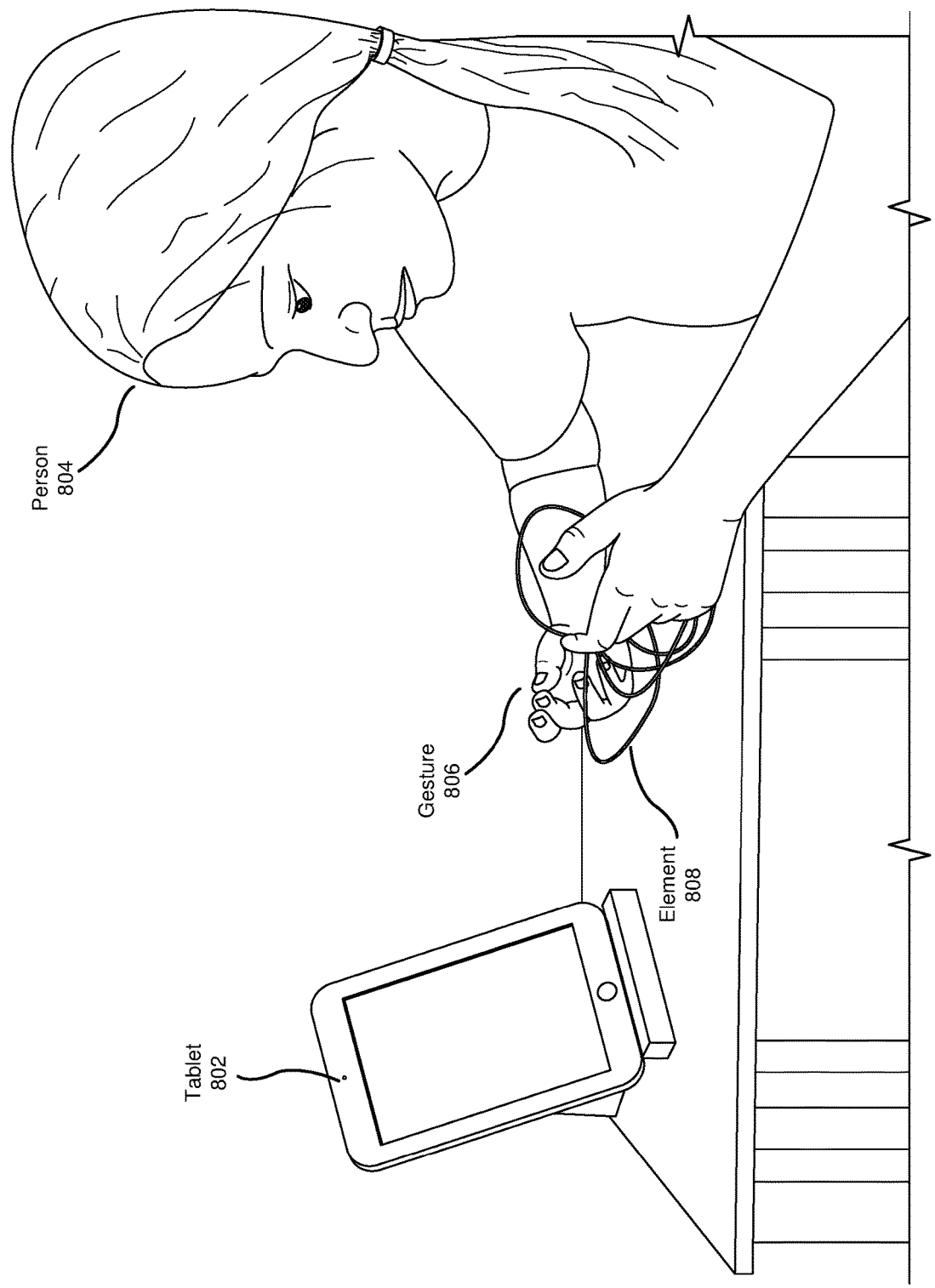
FIG. 8 is an illustration of an exemplary system for directing adaptive camera systems via a gesture that includes an audio component.

In some embodiments, the gesture may include an audio component and/or an audio trigger may cue the camera system to detect the gesture. For example, as illustrated in FIG. 8, a person 804 may be working on a craft project that includes an element 808. In this example, person 804 may snap their fingers to perform gesture 806, cueing a camera system within a tablet 802 to focus the camera on element 808. In this example, by focusing the camera system in response to gesture 806, the systems described herein may enable person 804 to continue working on the craft project without pausing to manually adjust the positioning of tablet 802 and/or the settings of the camera system in tablet 802.

Figure 9:
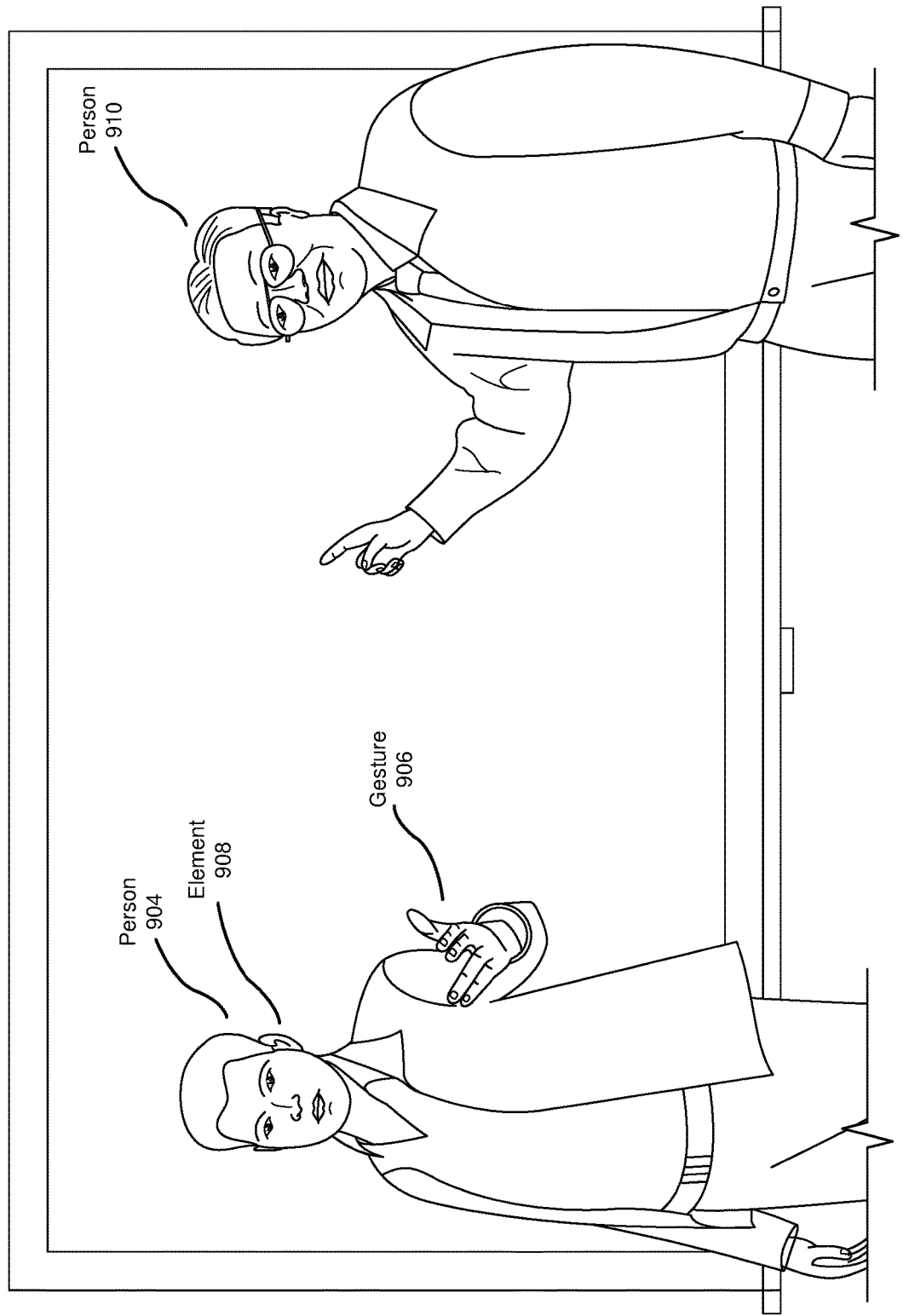
FIG. 9 is an illustration of an exemplary system for directing adaptive camera systems to perform actions related to a person performing the gesture.

In some examples, the person performing the gesture may also be the element of the physical environment indicated by the gesture. For example, as illustrated in FIG. 9, a person 904 may perform a beckoning gesture 906, in response to which the camera system may pan the camera frame over to an element 908, which is person 904 himself. In one example, the camera frame may have previously been centered on a person 910 and may not have included person 904, who might have been within the camera system's field of view and thus visible to the camera system despite not being within the camera frame.

In other examples, the element of the physical environment may be a person who is not performing the gesture. For example, person 904 may perform a shooing gesture in the direction of person 910, triggering the camera system to pan the camera frame to include and/or center on person 910.

In one embodiment, the camera system may include and/or be part of a videoconferencing system, monitoring the person within the physical environment may include monitoring a participant in a videoconference that includes at least one additional participant who does not share the physical environment with the participant, and performing the action may include increasing a visibility of the element of the physical environment within a video feed that is displayed by the camera system to the additional participants in the videoconference. For example, person 904 and person 910 may be part of a videoconference that includes participants in remote offices. In one example, person 904 may initially not be within the camera frame of the video feed that is being sent to the remote participants. In this example, person 904 may perform a beckoning gesture 906, in response to which the camera system may shift the video frame to include person 904, so that remote participants in the videoconference can see person 904 as he speaks during the videoconference. In another example, the camera frame may initially include both person 904 and person 910, and person 904 may perform beckoning gesture 906 to direct the camera to zoom in on person 904, giving him greater visibility to the remote participants.

Figure 10:
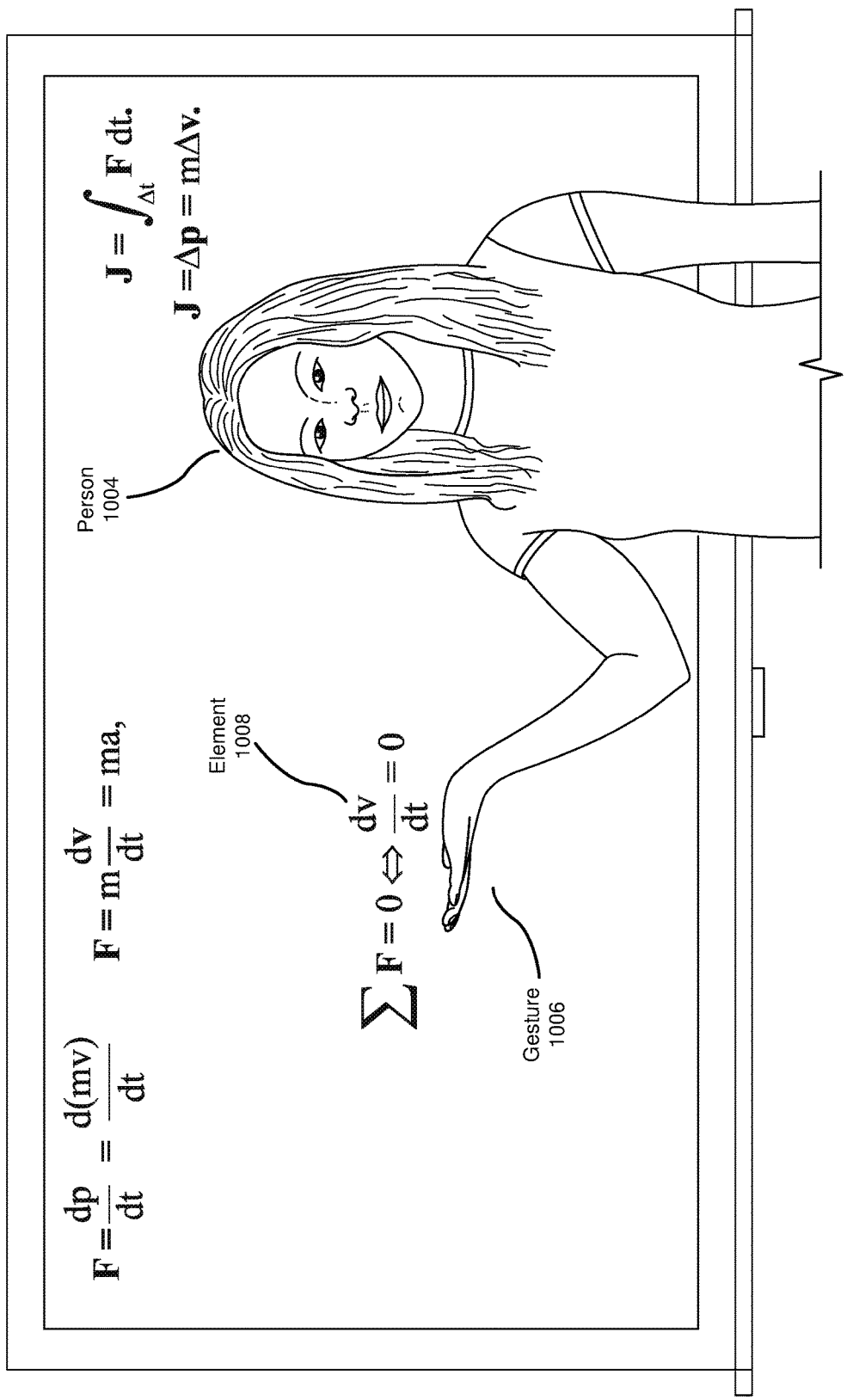
FIG. 10 is an illustration of an exemplary system for directing adaptive camera systems to perform actions related to an element of the physical environment.

In some examples, a person may use a palm-up displaying gesture to indicate to others an element of the physical environment. For example, as illustrated in FIG. 10, a person 1004 may perform a palm-up displaying gesture 1006 to indicate an element 1008. In one example, the camera system may recognize palm-up displaying gesture 1006 as indicating element 1008 and may, in response, temporarily increase the quality of a video stream and/or adjust the gain control, color balance, and/or other elements of the video settings to ensure that element 1008 is legible to viewers of the video stream. In some embodiments, different gestures may cue the camera system to perform different actions. For example, a pointing gesture may cue the camera system to zoom in on the indicated element, a circling gesture may cue the camera system to save a picture of the indicated element, and/or a palm-up displaying gesture may cue the camera system to visually highlight the indicated element in a video feed. Additionally or alternatively, the same gesture may cue the camera system to perform different actions in different contexts. For example, a palm-up displaying gesture during a videoconference may cue the camera system to visually highlight the element, while the same palm-up displaying gesture performed outside of a videoconference may cue the camera system to retrieve information about the indicated element.

Figure 11:
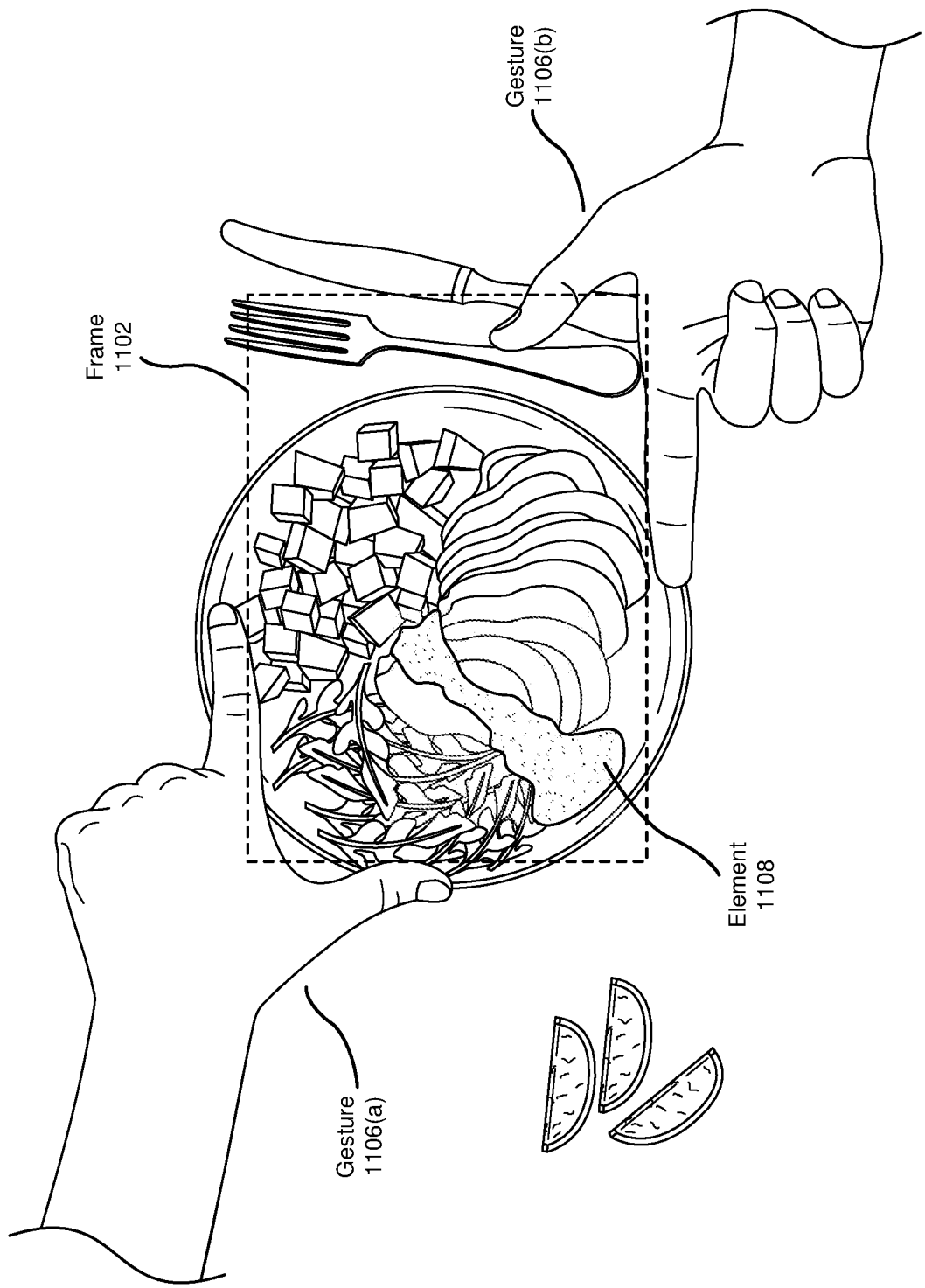
FIG. 11 is an illustration of an exemplary system for directing adaptive camera systems via two-handed gestures.

In some examples, a person may perform a gesture with more than one hand. For example, as illustrated in FIG. 11, a person may perform a framing gesture 1106 by performing gesture 1106(a) with their left hand and gesture 1106(b) with their right hand. In some embodiments, framing gesture 1106 may cue the camera system to match the camera frame to frame 1102 formed by gesture 1106 and/or focus on element 1108 within frame 1102. In one example, framing gesture 1106 may cue the camera system to take a picture of everything within frame 1102. Other examples of gestures performed with two hands may include, without limitation, beckoning with two hands, shooing with two hands, outlining a shape with both hands, and/or pointing with both hands.

Figure 12:
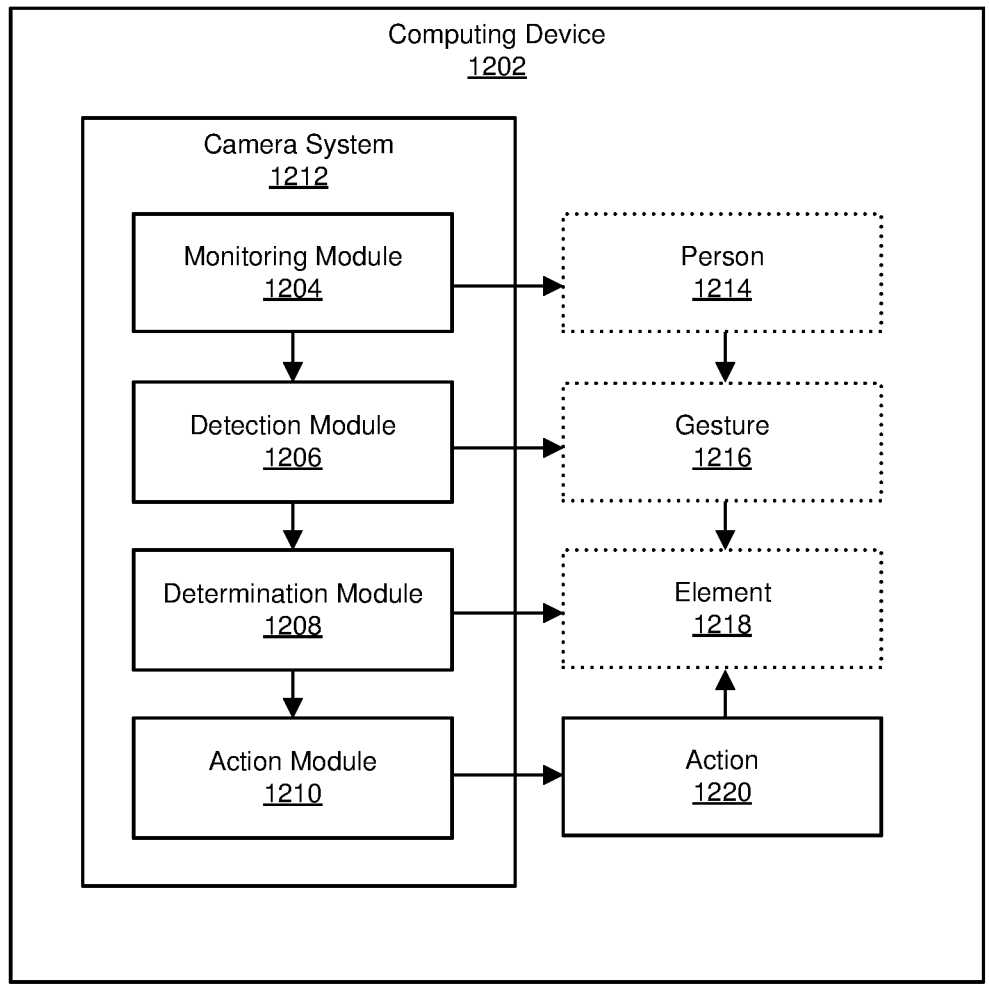
FIG. 12 is a block diagram of an exemplary system for directing adaptive camera systems.

In some embodiments, the systems described herein may be represented as modules stored in memory on a computing device, such as computing device 1202 in FIG. 12. In one embodiment, a computing device 1202 may host a camera system 1212. In some examples, a monitoring module 1204 may monitor a person 1214. At some point in time, a detection module 1206 may detect a gesture 1216 performed by person 1214. Next, a determination module 1208 may determine that gesture 1216 indicates an element 1218. In response to determining that gesture 1216 indicates element 1218, an action module 1210 may perform an action 1220 on element 1218. In some embodiments, computing device 1202 may represent a personal computing device such as a desktop computer, laptop computer, and/or tablet. In one embodiment, computing device 1202 may represent a mobile device such as a mobile phone. In some embodiments, computing device 1202 may represent a wearable device such as a headset, a smart necklace, a smart watch, and/or other type of wearable. Additionally or alternatively, computing device 1202 may represent a smart home appliance such as a television system with an integrated camera and/or a security camera. In one embodiment, computing device 1202 may represent a videoconferencing system. Although illustrated as one element, in some embodiments, computing device 1202 may represent multiple computing devices. For example, a smart necklace with limited processing power may include monitoring module 1204 but may send the video feed to a server that analyzes the video feed via detection module 1206 and/or determination module 1208 and then sends instructions to action module 1210 on the smart necklace.

As explained above, the systems and methods described herein may enable a person to direct an adaptive camera system using intuitive human-readable gestures such as pointing, beckoning, or snapping. By enabling the person to direct the camera system through gestures, the systems described herein may enable a user to change a camera's settings, save information, retrieve information, display additional information, and/or perform other tasks related to the camera system without pausing other activities the user may be engaged in, such as teaching a class, leading a conference, or working on a craft project. By using human-readable gestures rather than artificial gestures, the systems described herein may enable the user to intuitively control the adaptive camera system without having to learn new gestures or perform awkward gestures that disrupt the flow of the user's other activities.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive visual data to be transformed into computing instructions, transform the visual data into computing instructions, output a result of the transformation to direct a camera system to perform an action, use the result of the transformation to perform an action, and store the result of the transformation to maintain a log of actions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
monitoring, via a camera that is part of a camera system, a person within a physical environment;
detecting, by the camera system, a gesture performed by the person being monitored by the camera, wherein the gesture is intelligible to humans and used by the person to communicate with other humans;
identifying an element of the physical environment based on determining, by the camera system and in response to detecting the gesture, that the gesture indicates the element of the physical environment as an element of interest to the camera system;
determining, based on the gesture, an action to be performed by the camera system; and
performing, by the camera system and in response to both identifying the element of the physical environment and determining the action to be performed, the action directed at the element of the physical environment that treats the element of the physical environment as the element of interest.

2. The computer-implemented method of claim 1, wherein the gesture comprises a human-readable gesture.

3. The computer-implemented method of claim 1, wherein the gesture indicates the element of the physical environment to an additional person; and
the camera system performs the action in response to determining that the gesture indicated the element of the physical environment to the additional person.

4. The computer-implemented method of claim 1, wherein performing, by the camera system, the action comprises determining that the gesture is correlated with a predetermined action from a list of actions correlated with gestures.

5. The computer-implemented method of claim 1, wherein performing the action comprises physically moving the camera by the camera system.

6. The computer-implemented method of claim 1, wherein performing the action comprises adjusting a camera frame of the camera.

7. The computer-implemented method of claim 6, wherein performing the action comprises moving the camera frame of the camera to include within the camera frame the element of the physical environment indicated by the gesture.

8. The computer-implemented method of claim 6, wherein performing the action comprises adjusting the camera frame of the camera to increase a prominence within the camera frame of the element of the physical environment indicated by the gesture.

9. The computer-implemented method of claim 1, wherein performing the action comprises changing a focus of the camera to the element of the physical environment indicated by the gesture.

10. The computer-implemented method of claim 1, wherein performing the action comprises retrieving, by the camera system, information about the element of the physical environment indicated by the gesture.

11. The computer-implemented method of claim 1, wherein performing the action comprises displaying information about the element of the physical environment indicated by the gesture.

12. The computer-implemented method of claim 1, wherein performing the action comprises storing, by the camera system, information about the element of the physical environment indicated by the gesture.

13. The computer-implemented method of claim 1, wherein:
the gesture comprises a pointing gesture at the element of the physical environment; and
the element of the physical environment comprises an object.

14. The computer-implemented method of claim 1, wherein:
the gesture indicates a portion of the physical environment; and
determining, by the camera system, that the gesture indicates the element of the physical environment comprises examining, by the camera system, the portion of the physical environment indicated by the gesture.

15. The computer-implemented method of claim 1, wherein:
the gesture comprises a hand gesture; and
monitoring, via the camera that is part of a camera system, the person within the physical environment comprises motion tracking a hand of the person.

16. The computer-implemented method of claim 1, wherein:
the camera system comprises an augmented reality system; and
performing the action comprises the augmented reality system augmenting the physical environment with an augmented reality element that corresponds to the element of the physical environment.

17. The computer-implemented method of claim 1, wherein:
the camera system comprises a videoconferencing system;
monitoring the person within the physical environment comprises monitoring a participant in a videoconference that comprises at least one additional participant who does not share the physical environment with the participant; and
performing the action comprises increasing a visibility of the element of the physical environment within a video feed that is displayed by the camera system to the additional participant in the videoconference.

18. A system comprising:
a monitoring module, stored in memory, that monitors, via a camera that is part of a camera system, a person within a physical environment;
a detection module, stored in memory, that detects, by the camera system, a gesture performed by the person being monitored by the camera, wherein the gesture is intelligible to humans and used by the person to communicate with other humans;
a determination module, stored in memory, that:
identifies an element of the physical environment based on determining, by the camera system and in response to detecting the gesture, that the gesture indicates the element of the physical environment as an element of interest to the camera system; and
determines, based on the gesture, an action to be performed by the camera system;
an action module, stored in memory, that performs, by the camera system and in response to both identifying the element of the physical environment and determining the action to be performed, the action directed at the element of the physical environment that treats the element of the physical environment as the element of interest; and
at least one physical processor that executes the monitoring module, the detection module, the determination module, and the action module.

19. The system of claim 18, wherein the gesture comprises a human-readable gesture.

20. A non-transitory computer-readable medium comprising:
one or more computer-readable instructions that, when executed by at least one processor of a computing device, cause the computing device to:
monitor, via a camera that is part of a camera system, a person within a physical environment;
detect, by the camera system, a gesture performed by the person being monitored by the camera, wherein the gesture is intelligible to humans and used by the person to communicate with other humans;
identify an element of the physical environment based on determining, by the camera system and in response to detecting the gesture, that the gesture indicates the element of the physical environment as an element of interest to the camera system;
determine, based on the gesture, an action to be performed by the camera system; and
perform, by the camera system and in response to both identifying the element of the physical environment and determining the action to be performed, the action directed at the element of the physical environment that treats the element of the physical environment as the element of interest.

* * * * *